United States Patent
Togashi et al.

(10) Patent No.: US 8,150,916 B2
(45) Date of Patent: Apr. 3, 2012

(54) METHOD, APPARATUS, AND SYSTEM FOR TRANSMITTING INFORMATION

(75) Inventors: Ryuichiro Togashi, Kanagawa (JP); Shigetaka Kudou, Kanagawa (JP); Yasuhiko Otani, Tokyo (JP)

(73) Assignee: Sony Corporation, Tokyo (JP)

( * ) Notice: Subject to any disclaimer, the term of this patent is extended or adjusted under 35 U.S.C. 154(b) by 613 days.

(21) Appl. No.: 10/976,028

(22) Filed: Oct. 28, 2004

(65) Prior Publication Data

US 2005/0144224 A1    Jun. 30, 2005

(30) Foreign Application Priority Data

Oct. 28, 2003 (JP) ................. 2003-367294

(51) Int. Cl.
G06F 15/16 (2006.01)
(52) U.S. Cl. ...................................... 709/204
(58) Field of Classification Search ........... 709/204–205
See application file for complete search history.

(56) References Cited

U.S. PATENT DOCUMENTS

| | | | | |
|---|---|---|---|---|
| 5,535,208 | A * | 7/1996 | Kawakami et al. | 370/391 |
| 5,951,646 | A * | 9/1999 | Brandon | 709/231 |
| 6,504,847 | B1 * | 1/2003 | Horlander | 370/431 |
| 6,523,696 | B1 * | 2/2003 | Saito et al. | 709/223 |
| 2002/0024956 | A1 * | 2/2002 | Keller-Tuberg | 370/395.52 |
| 2002/0065868 | A1 * | 5/2002 | Lunsford et al. | 709/200 |
| 2002/0174172 | A1 * | 11/2002 | Hatalkar | 709/203 |
| 2003/0023741 | A1 * | 1/2003 | Tomassetti et al. | 709/231 |
| 2003/0050009 | A1 * | 3/2003 | Kurisko et al. | 455/41 |
| 2003/0165160 | A1 * | 9/2003 | Minami et al. | 370/466 |
| 2004/0224638 | A1 * | 11/2004 | Fadell et al. | 455/66.1 |
| 2005/0198193 | A1 * | 9/2005 | Halme | 709/217 |

FOREIGN PATENT DOCUMENTS

| | | |
|---|---|---|
| EP | 0682430 A2 | 11/1995 |
| JP | 64-008741 | 1/1989 |
| JP | 2001-103066 A | 4/2001 |
| JP | 2003-242060 | 8/2003 |
| WO | WO 03/003658 A1 | 1/2003 |

OTHER PUBLICATIONS

SyncML Sync Protocol, version 1.0, http://www.openmobilealliance.org/tech/affiliates/syncml/syncml_protocol_v10_20001207.pdf, Dec. 7, 2000.*
Salling Clicker v1.5 Press Release, http://www.salling.com/pr/2003/april_sec.html, Apr. 4, 2003.*
O'Reilly macdevcenter.com, 'Using iSync and Bluetooth', http://www.oreillynet.com/lpt/a/2840, Oct. 18, 2002.*
IEEE P802.15-01/121r1, 'Wireless Personal Area Networks', Mar. 2001.*
European Search Report Feb. 7, 2005 of Application No. 04256623.2.

* cited by examiner

Primary Examiner — John MacIlwinen
(74) Attorney, Agent, or Firm — Wolf, Greenfield & Sacks, P.C.

(57) ABSTRACT

A server controls client apparatuses to transmit the same information to the client apparatuses without imposing workload on each client apparatus. The server is free from any interruption of the transmission of information signal unintended by the server. The server receives information designating at least one client apparatus as a destination of the information signal through a keyboard of the server, and transmits audio contents stored in a content storage hard disk to each of the client apparatuses, designated in the received designate information, through a controller and a communication unit. At least one client apparatus concurrently plays the audio content.

12 Claims, 10 Drawing Sheets

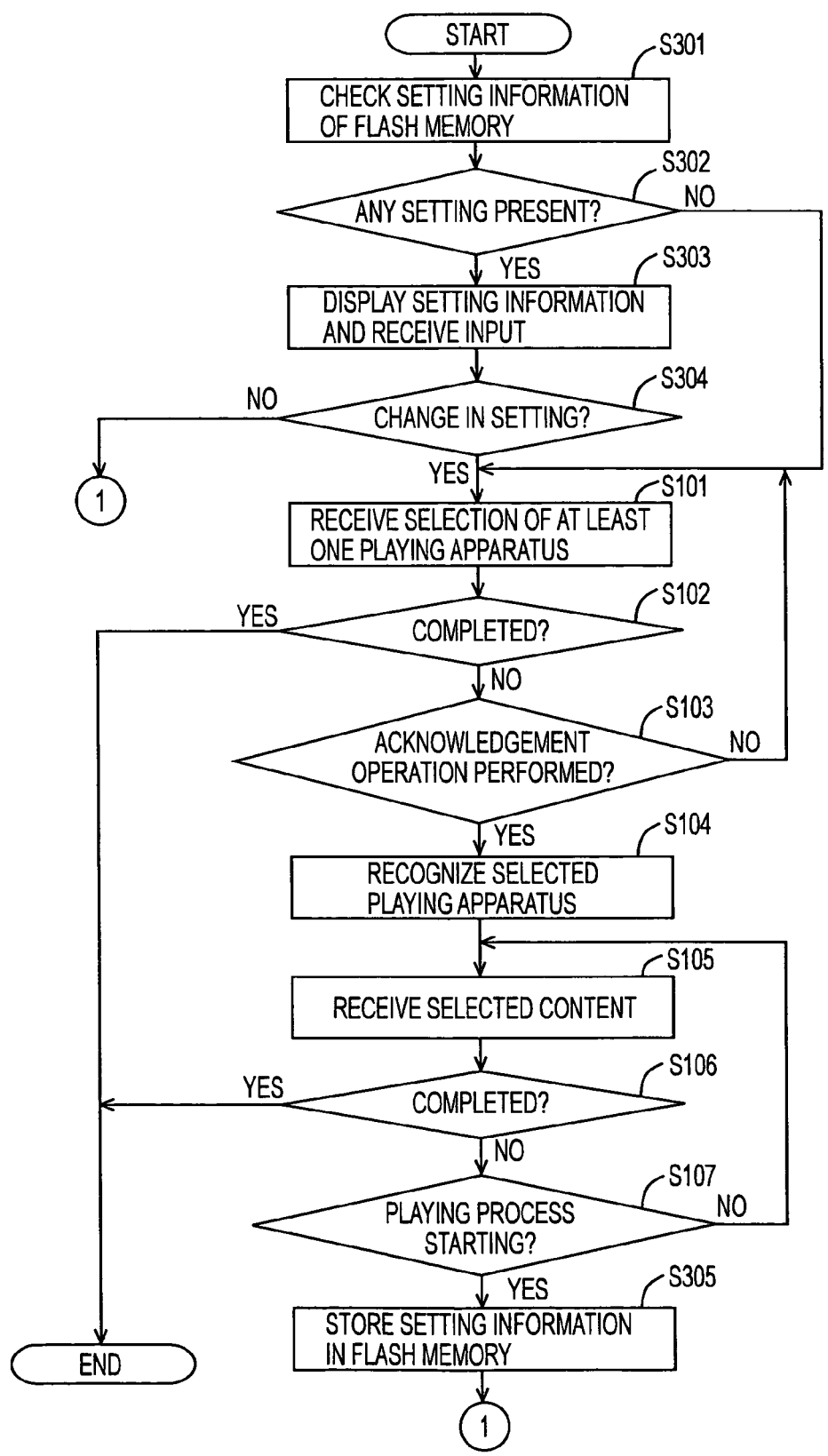

METHOD, APPARATUS, AND SYSTEM FOR TRANSMITTING INFORMATION

BACKGROUND OF THE INVENTION

1. Field of the Invention

The present invention relates to a method, an apparatus, and a system for transmitting information in a local area network (LAN), such as an Institute of Electrical and Electronics Engineers (IEEE) 802 network environment.

2. Description of the Related Art

With the widespread use of personal computers and the advances of the Internet, users use personal computers at home or offices to access a variety of servers over the Internet. The users download a diversity of content data, exchanges electronic mails, or participates in a chat system to exchange opinions through text data on a real-time basis.

Japanese Unexamined Patent Application Publication No. 2001-184292 discloses a technique of a chat system of the Internet in which a limited number of persons participating in a chat is allowed to concurrently listen to audio data.

Via a wide area network (WAN), users quickly acquire information at home or in offices, and smoothly exchange and share information. Communication technology has thus substantially advanced, providing convenient environments.

Sharing of files and printers is performed not only in a WAN but also in a LAN which is constructed in a limited area, such as home or offices, with personal computers and peripheral devices interconnected.

Known LANs employing universal asynchronous receiver-transceiver (UART) are unable to provide a sufficiently high data rate. It takes long time for the LAN to transmit or receive audio data requiring a data rate of about 1.4 MBps (Mbytes/s).

With universal serial bus (USB) introduced, personal computers transfer audio data from a USB connector. The maximum length of a USB cable is limited to 5 m. Under this limitation, a typical application of a peripheral device is a loudspeaker device of the personal computer used in the same room.

Communications in accordance with the today's widely used transmission control protocol/internet protocol (TCP/IP) not only achieve data rate and reliability in a performance level high enough to transfer audio data but also work with a cable extended to a maximum of 100 m in a LAN system installed at a home. Under these conditions, music is thus listened to everywhere in a wide area. With an apparatus, such as a network hub, the number of networked apparatuses is increased.

A plurality of pieces of audio data can be transferred at a time in view of communication bandwidth. If one server having a typical throughput is available, the server can concurrently supply client apparatuses in a plurality of rooms with audio data.

Personal computers and a variety of audio visual (AV) apparatuses, installed at a home, are connected via a LAN. Content data stored in a personal computer, such as audio data, video data, and AV data (containing audio data and video data synchronized with each other), are enjoyed on respective apparatuses in a living room, a study room, a bed room, etc.

As in the WAN system, a client apparatus receiving information issues a request to a server providing information in the LAN system in a typical operation mode. In response, the server supplies the client apparatus with desired information. In a LAN system with a plurality of client apparatuses configured therewithin, the client apparatuses access the server to concurrently receive the desired contents thereof.

In the case of the LAN system installed at a home, typically referred to as a home network, users may wish the personal computer working as a server to play the same content on the AV apparatus in each of the rooms, or in predetermined rooms only.

More specifically, the same audio data is transmitted to all rooms so that the same music is enjoyed in all rooms. Alternatively, the same audio data is transmitted to two rooms, which could be child's rooms. Rather than in response to a request from the client apparatuses, the server actively controls the client apparatuses.

The technique disclosed in Japanese Unexamined Patent Application Publication No. 2001-184292 for sharing the audio data can be used in a WAN system. However, in accordance with the disclosed technique, not only text data but also audio data is shared among participants in the Internet chat system. Without completing registration, any user cannot enjoy audio data as a supply destination in the chat group. Even a registered user cannot receive audio data unless the client apparatus of the user issues a request to transmit.

The technique disclosed in Japanese Unexamined Patent Application Publication No. 2001-184292 has no concept that a predetermined controller, such as a server, actively controls a client apparatus as a destination of content data. The disclosed technique thus fails to fully satisfy the need that the predetermined controller, such as the server, flexibly controls the client apparatus in accordance with intended usage.

In the home network LAN system, the client apparatuses are typically consumer electronics (CEs) dedicated to processing audio data and video data, including AV apparatuses, such as hard disk recorders. With a TCP/IP application running on such a client apparatus, it is advisable not to impose a large workload on the client apparatus.

SUMMARY OF THE INVENTION

Accordingly, it is an object of the present invention to provide an information transmission method and an information transmission apparatus for controlling client apparatuses to transmit the same information to the client apparatuses without imposing workload on each client apparatus in a manner free from any interruption of the transmission of information signal unintended by a server as an information provider.

According to an aspect of the present invention, a method for transmitting information, includes a transmission destination designation step for designating at least one information usage apparatus as a destination of an information signal to one of information transmission apparatuses, a concurrent transmission step for transmitting the same information signal to the information usage apparatus designated in the transmission destination designation step, and an end notification step for notifying the designated information usage apparatuses of the end of transmission of the information signal when the transmission of the information signal is completed.

In accordance with the method of the present invention, at least one information usage apparatus is designated as a destination of information signal with respect to the information transmission apparatus in the transmission destination designation step. The information transmission apparatus transmits the same information signal to the information usage apparatuses. At least one information usage apparatus concurrently enjoys the same information signal. When the transmission of the information signal is completed, at least one information usage apparatus designated as the destination is notified of the end of the transmission of the information signal.

The information transmission apparatus transmits the information signal to at least one information usage apparatus designated as the destination even if the information usage apparatus issues no request. If an information usage apparatus configured to receive the information signal from the information transmission apparatus is installed at each room of a home, the same information can concurrently be transmitted to each of the information usage apparatuses for use in all rooms, or in a plurality of designated rooms.

In a preferred embodiment, the method further includes an identification information storage step for storing identification information of the information transmission apparatus, which is extracted from the information signal from the information transmission apparatus as a source when the designated information usage apparatus receives the information signal, and a control step for rejecting a request of an electronic apparatus having identification information different from the identification information stored in the identification storage step when each of the designated information usage apparatuses receives the information signal.

In accordance with the method of the present invention, the information usage apparatus extracts and stores the identification information of the information transmission apparatus in the identification information storage step. The information usage apparatus rejects the request of the electronic apparatus having the different identification information in the control step.

The information usage apparatus currently receiving the information signal from the information transmission apparatus processes the information signal with priority, preventing any other electronic apparatus from interrupting the reception of the information signal until the end of the transmission of the information signal. The transmission of the information signal is thus prevented from being interrupted, although the information transmission apparatus as an information source does not actually intended so.

In a preferred embodiment, the method further includes a production step for producing reply information which is to be transmitted to the electronic apparatus that is identified by the identification information contained in the request that is rejected in the control step, and a transmission step for transmitting the reply information produced in the production step to the electronic apparatus.

In accordance with the preferred embodiment, in the transmission step, the information usage apparatus transmits the reply information produced in the production step to the electronic apparatus, the request of which has been rejected. The reply information is transmitted to the electronic apparatus so that the electronic apparatus in question does not mistake the rejection for a trouble thereof, a trouble in the information usage apparatus, a trouble in the network, etc.

In a preferred embodiment, at least one of the information transmission apparatus and the information usage apparatus has a function for controlling an electronic apparatus connected to the same network of the information transmission apparatus and the information usage apparatus in response to an instruction from a user.

In accordance with the preferred embodiment, at least one of the information transmission apparatus and the information usage apparatus has a function as a control apparatus. In other words, all information transmission apparatuses and all information usage apparatuses, connected to the same network, can have the function as a control apparatus. A single information transmission apparatus or a single information transmission apparatus can have the function as a control apparatus. Any number of information transmission apparatuses and any number of information transmission apparatuses can have the function as a control apparatus.

The electronic apparatus having the function as a control apparatus designates at least one information usage apparatus as the destination of information with respect to the information transmission apparatus. The information transmission apparatus thus transmits the information signal to at least one designated information usage apparatus.

In a preferred embodiment, the method further includes a storing step for storing identification information of at least one information usage apparatus designated as a destination of the information signal. The identification information of the information usage apparatus stored in the storing step is used to repeatedly transmit the information signal to the information usage apparatuses.

In accordance with the preferred embodiment, the identification information of at least one information usage apparatus designated as a destination of the information signal is stored in the storing step. Using the identification information stored in the storing step, the information signal is repeatedly transmitted to the information usage apparatus by any number of times unless the designation is modified, or eliminated.

A plurality of information usage apparatuses receive contents, such as audio data, and use the received contents. If the received information signal is an audio signal, the audio signal is played at a plurality of listening points. Similarly, a message is provided to a plurality of users through a plurality of information usage apparatuses.

The information signal is transmitted to intended ones from among a plurality of information usage apparatuses while no information signal is transmitted at all to the information usage apparatuses that do not need the information. When the information signal is concurrently transmitted to a plurality of information usage apparatuses, the concurrent transmission is processed with priority in a manner free from interruptions.

The information transmission apparatus can intentionally suspend the transmission of the information signal to any or all information usage apparatuses.

A predetermined control apparatus, such as the information transmission apparatus, designates at least one information usage apparatus as a destination of the information signal. In comparison with the case in which each information usage apparatus individually receives the information signal from the information transmission apparatus, the amount of operation of the information usage apparatus is small. The information usage apparatus is thus free from an increase in workload with the functions thereof reduced.

Since the operation of the information usage apparatus for acting on the information transmission apparatus is minimized, the content of a display relating to the transmission of the information is simplified on the information usage apparatus.

With any information usage apparatus having a control function, own information usage apparatus and the other information usage apparatus can concurrently receive the information signal. The ease of use of the system is thus assured.

BRIEF DESCRIPTION OF THE DRAWINGS

FIG. 10 is a flowchart illustrating the other operation of the server.

DESCRIPTION OF THE PREFERRED EMBODIMENTS

An information transmission method and an information transmission apparatus of one preferred embodiment of the present invention are described with reference to the drawings. In the following embodiment, a LAN system is applied as a home network system in accordance with the preferred embodiment.

Figure 1:
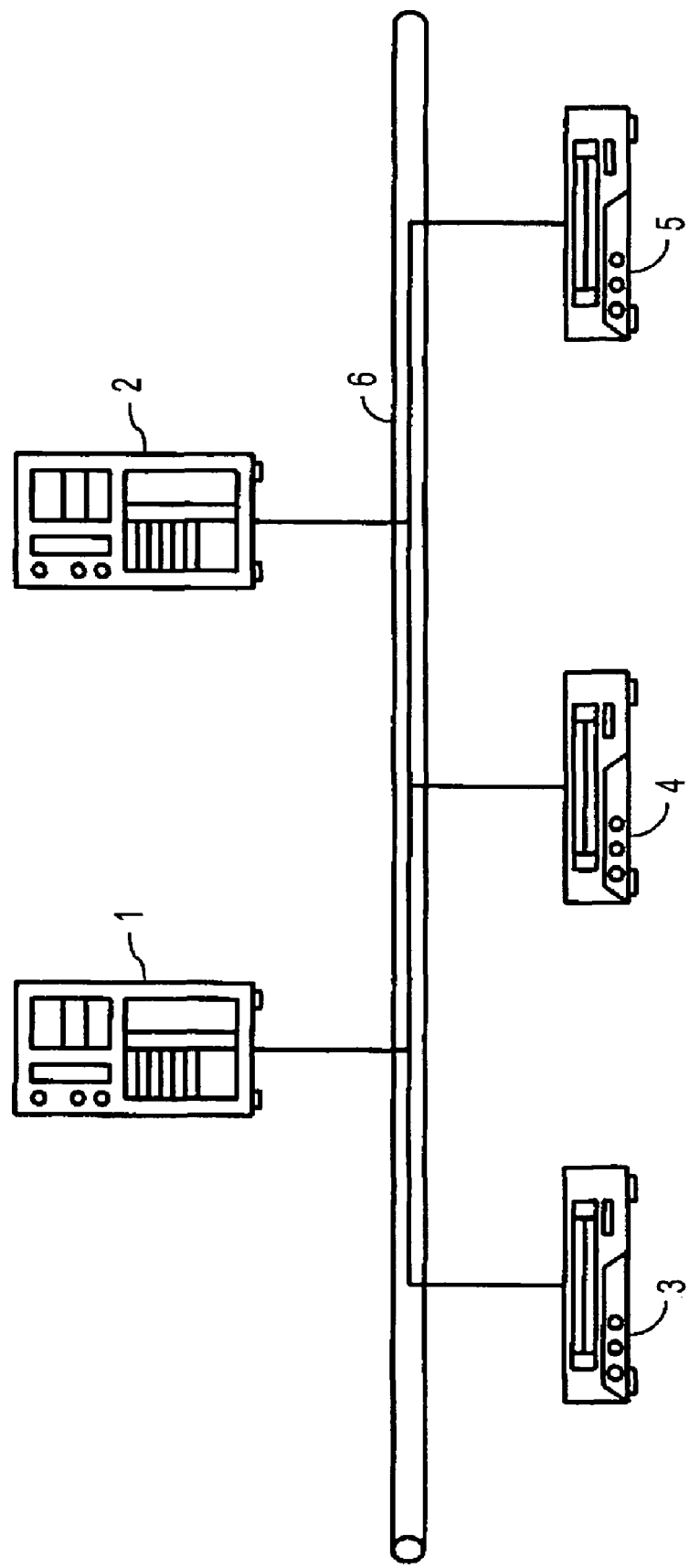
FIG. 1 is a block diagram of a home network system of an embodiment of the present invention.

The home network system of the preferred embodiment of the present invention is described below. As shown in FIG. 1, the home network system includes servers 1 and 2, audio-playing apparatuses 3, 4, and 5, connected to each of the servers 1 and 2 via a LAN 6.

The servers 1 and 2 are information processing apparatuses, such as personal computers, with the function to connect with the LAN 6. Each of the servers 1 and 2 includes a large-capacity recording medium, such as a hard disk, and a replay device for an optical disk, such as a compact disk (CD) or a digital versatile disk (DVD). Audio data stored in the hard disk or audio data recorded on the CD or the DVD is supplied to each of the audio playing apparatuses 3, 4, and 5 via the LAN 6. In this preferred embodiment, the server 1 is installed in a living room, and the server 2 is installed in a study, for example.

For example, each of the audio playing apparatuses 3, 4, and 5 can be a CD player, a radio tuner, or the like, each having the function to connect with the LAN 6. In addition to the known functions to read audio data recorded on the CD for playing and to receive broadcast radio signals for listening, the audio playing apparatuses 3, 4, and 5 receive audio data supplied via the LAN 6, and decode and play the audio data. In this preferred embodiment, the audio playing apparatuses 3, 4, and 5 are installed in different rooms.

The servers 1 and 2 have the function of an information transmission apparatus to transmit audio data. Each of the audio playing apparatuses 3, 4, and 5 has the function of a client apparatus (information usage apparatus) to receive the audio data from the servers 1 and 2.

The audio playing apparatuses 3, 4, and 5 can enjoy different audio contents supplied by the server 1 or the server 2. Depending on desired audio data (audio contents), each of the audio playing apparatuses 3, 4, and 5 selects one of the server 1 and the server 2 as a provider of the audio data.

The audio playing apparatuses 3, 4, and 5 are network joining type electronic apparatuses complying with universal plug & play (UPnP®) proposed by Microsoft to assure the ease of connection.

The UPnP® is a specification of a group of protocols and data formats, including Internet Protocol (IP) and Transmission Control Protocol (TCP) working on the IP, and user datagram protocol (UDP), functioning in IEEE 802 network, typical of network communications using Ethernet® of 10/100BASE-T.

A CE device, such as an audio playing apparatus, incorporating the UPnP, easily performs a mutual authentication process with another CE device or a personal computer. The supplying of a service via a network and the execution of the service are easily and appropriately performed without the need for troublesome user operation.

Figure 2:
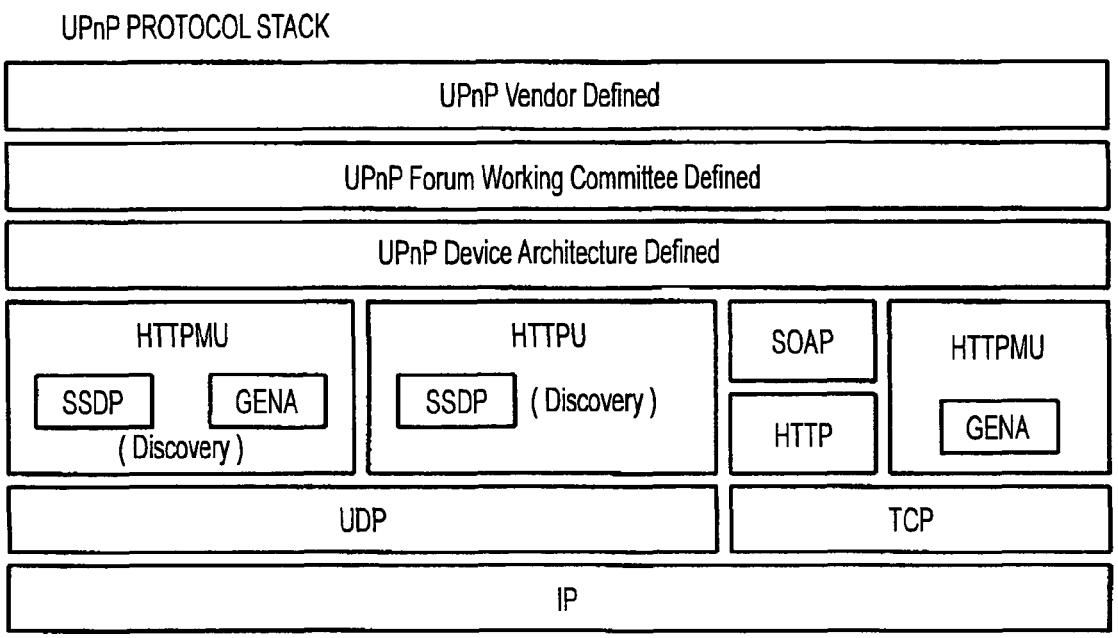
FIG. 2 illustrates a protocol stack of UPnP.

The UPnP as one of the specifications incorporated in the CE apparatuses, such as audio playing apparatuses, forming the network is briefly described below. FIG. 2 illustrates the protocol stack of the UPnP (the structure of a protocol group). As shown, actual data is transmitted and received using Internet standard communication protocols such as IP, TCP, and UDP in the UPnP.

As will be discussed later, UPnP includes a group of protocols including simple service discovery protocol (SSDP), general event notification architecture (GENA), simple object access protocol (SOAP), hypertext transfer protocol (HTTP), etc. to perform the functions unique to UPnP.

As shown in FIG. 2, UPnP is UPnP vendor defined, UPnP forum working committee defined, and UPnP device architecture defined.

UPnP presents six functions including addressing, discovery, description, control, eventing, and presentation. The six functions presented by UPnP are described below.

An UPnP apparatus (an electronic apparatus incorporating an UPnP function), such as an audio playing apparatus, complies with UPnP AV architecture to use audio data with the UPnP functions. The UPnP apparatuses complying with the UPnP AV architecture are divided into three types: a media server for providing content data, a control point functioning a control terminal, and a media renderer functioning as a player. The media server is typically referred to as a server in the network system, and the media renderer is typically referred to as a client apparatus.

The control point controls the UPnP apparatus connected to the network. The function of the control point can be provided on each of the media server and the media renderer. Furthermore, the function of the control point is provided on all or several electronic apparatuses forming the network. In this preferred embodiment, each of the servers 1 and 2 and the audio playing apparatuses 3, 4, and 5 is provided with the function of the control point.

The addressing function of UPnP allows each UPnP apparatus to acquire an address for identifying own apparatus in the IEEE 802 network, and dynamic host configuration protocol (DHCP) or Auto IP is used in the addressing function.

The discovery function is performed subsequent to the addressing function. With the discovery function, the control point finds a target apparatus (media server or media renderer) to control. The protocol used in the discovery function is SSDP. When connected to the IEEE 802 network, each of the electronic apparatuses forming the network system multicasts, over the IEEE 802 network, a message notifying of devices and services provided by own apparatus (in other words, transmits the message in packet to unspecified destinations). Upon receiving the multicast message, the control point knows the apparatuses connected to the IEEE 802 network.

A uniform resource locator (URL) of a device description is described in an SSDP packet output from an electronic apparatus found as a target to be controlled by the control point in the discovery function. By accessing the URL, the control point acquires more detailed device information concerning the electronic apparatus from the device description.

The device information includes a service description, in which icon information, model name, manufacturer's name, product name, and detailed information of service provided by the device. The control point can learn a method for accessing a target apparatus from the device description and the service description. The device description and the service description are written in extensible markup language (XML).

The functions of the control point are divided into two major functions: action and query. The action is performed in accordance with the manner defined in action information in the service description. With the action invoked, the control point operates a target apparatus. The query is used to retrieve device information (state variable) in the service description. The control point uses a transport protocol called the SOAP written in XML.

When the value of the device information is modified, the target apparatus notifies in the eventing function the control point of the modification. The control point analyzes the service description of the target apparatus, thereby learning the variable held by the target apparatus from the device information. When the variable is modified, the control point receives a notification of the modification from the target apparatus. The eventing function uses a transport protocol called GENA previously mentioned and written in XML.

The presentation function is used to provide a user with control means using a user interface. The UPnP apparatus acquires a presentation page written in HTML by accessing a presentation URL described in the device description. With the presentation function, the target apparatus prepares application programs.

The UPnP apparatus participates in the network using the UPnP functions without causing the user to perform complex operations. The UPnP apparatus is thus ready to communicate and detects and connects to another UPnP apparatus automatically.

Figure 3:
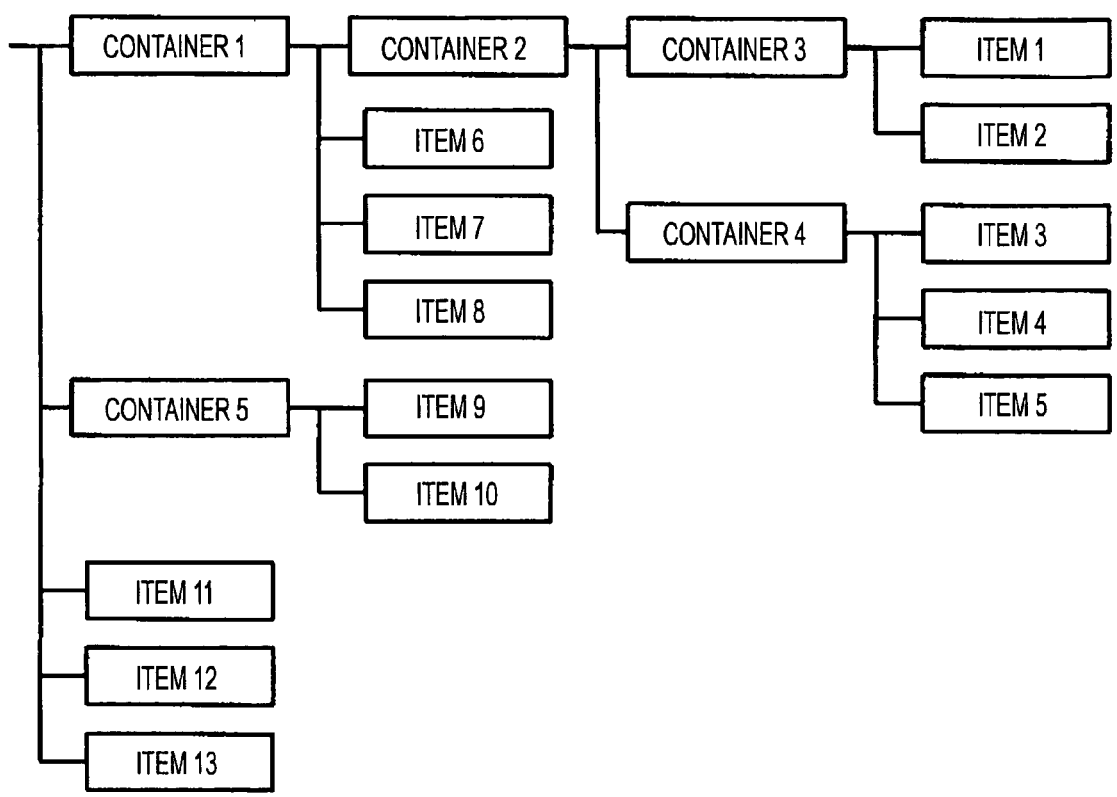
FIG. 3 illustrates containers and items of the UPnP.

The media server, as the UPnP apparatus, is provided with a built-in contents directory service, and notifies the control point of the contents stored in the media server. The CDS includes two types of abstracted objects, namely, a container and an item. The container and the item correspond to a folder and a file in Windows® operating system supplied by Microsoft. The containers and items are arranged in a tree structure as shown in FIG. 3. In this specification, an audio content (audio data) refers to an item of FIG. 3.

The control point acquires the URL of each content (a link bearing information) by acquiring the tree information of FIG. 3 from the media server. Upon acquiring a desired audio content (item), the control point plays the audio content, stops playing the audio content and performs an operation on an audio track (audio data) using the function of AV transport of the media server.

The servers 1 and 2 and the audio playing apparatuses 3, 4, and 5 use the addressing function of UPnP, thereby performing TCP/IP communications, and authenticating each other using the UPnP discovery function. Each apparatus thus learns the structure of the network, and communicates with a target electronic apparatus.

Figure 4:
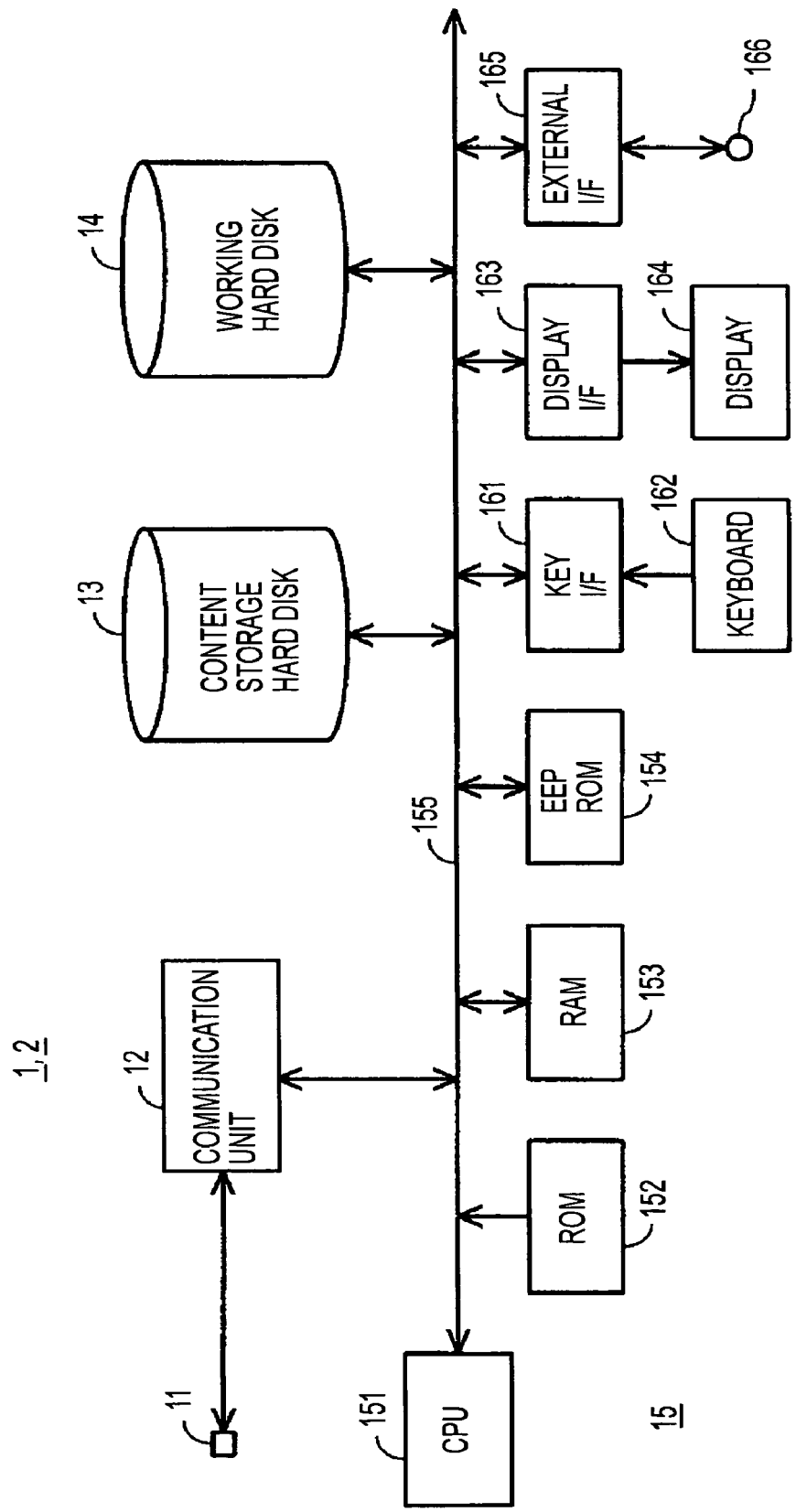
FIG. 4 is a block diagram illustrating the basic structure of a server.
Figure 5:
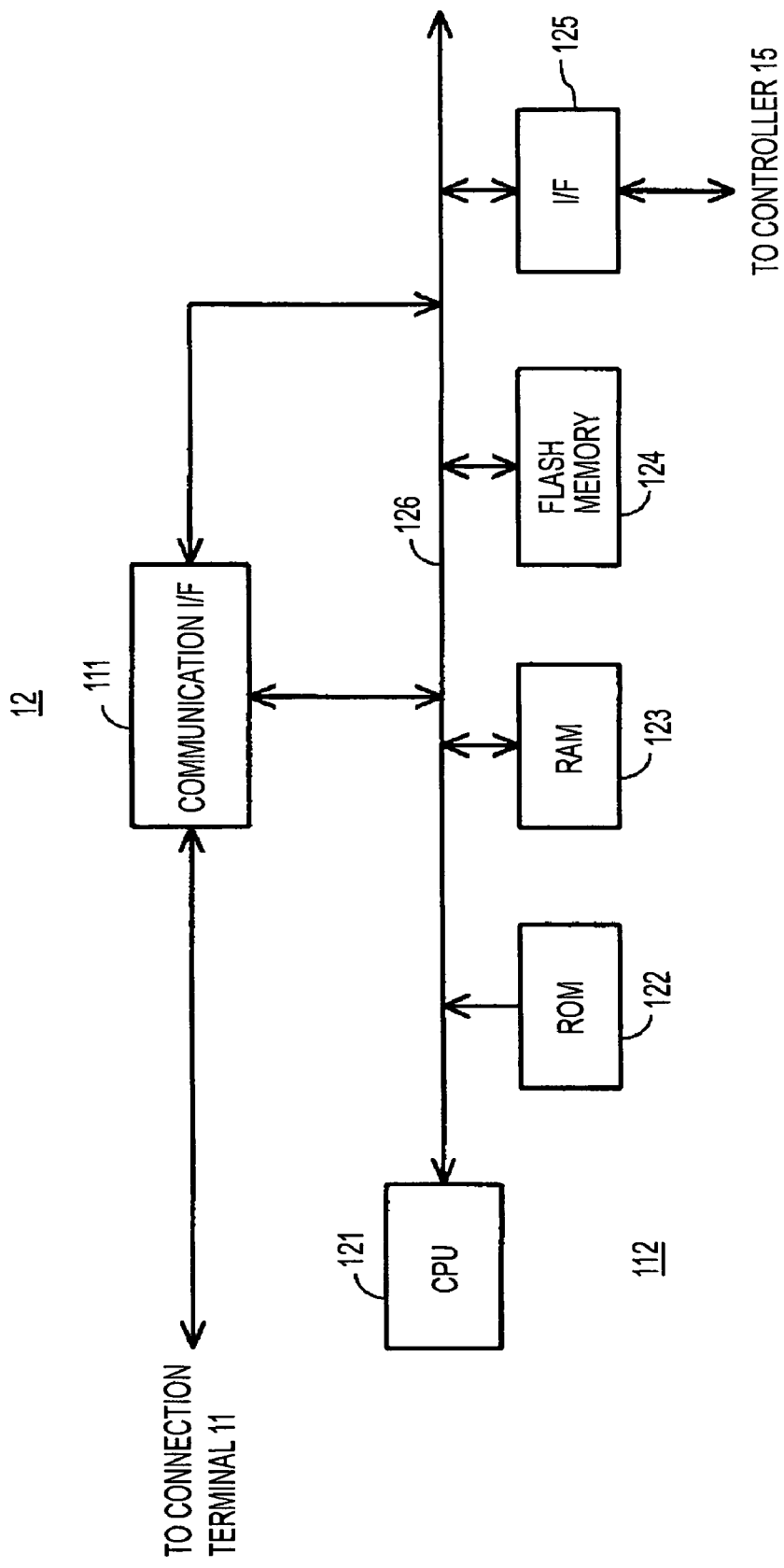
FIG. 5 is a block diagram illustrating the structure of a communication unit of the server.

The structure of each electronic apparatus forming the home network system of the preferred embodiment is described below. The structure of the servers 1 and 2 is first discussed. FIG. 4 is a block diagram generally illustrating the basic structure of the servers 1 and 2, and FIG. 5 is a block diagram illustrating the structure of a communication unit 12 of the servers 1 and 2.

As shown in FIG. 4, each of the servers 1 and 2 includes a terminal 11 for connection with the LAN 6, the communication unit 12, a content storage hard disk 13 storing a large number of digital contents (information), a working hard disk 14, a controller 15, a key interface 161, a keyboard 162, a display interface 163, a display 164, an external interface 165, and an external input and output terminal 166.

The controller 15 controls the blocks in own apparatus, and is a microcomputer including a central processing unit (CPU) 151, a read-only memory (ROM) 152, a random-access memory (RAM) 153, an electrically erasable programmable ROM (EEPROM) 154, and a CPU bus 155 interconnecting these blocks.

The ROM 152 stores programs performed by the CPU 151 and data required in processes. The RAM 153 serves as a working memory area for a variety of processes. The EEPROM 154 is a non-volatile memory, and stores a variety of parameters.

The keyboard 162 receives operational inputs from a user, and includes arrow keys for moving a cursor, and various function keys. An electrical signal input in response to an operational input entered on the keyboard 162 by a user is supplied to the controller 15 via the key interface 161. Each of the server 1, the personal computer 2, and a notebook computer 4 performs a process in response to the operational input from the user.

The display 164 displays an image. Upon receiving a display video signal processed through the display interface 163 controlled by the controller 15, the display 164 displays a variety of images on the display screen thereof. For example, the display 164 displays a variety of display messages that are produced by the controller 15 and supplied through the display interface 163.

The display 164 is supplied, through the display interface 163, with the display video signal for message data, text data, still image data, and moving image data stored in the content storage hard disk 13. The display 164 displays a video corresponding to the display data stored in the content storage hard disk 13.

The external interface 165 outputs data to and receives data from an external device through the external input and output terminal 166. To output data from own apparatus, the external interface 165 produces output data in a predetermined data format, and outputs the data through the external input and output terminal 166. The external interface 165 converts data in a predetermined format received through the external input and output terminal 166 into data in a format compatible with the controller 15, and then supplies the converted data to the controller 15.

The servers 1 and 2 are personal computers, for example. The keyboard 162 is an external keyboard, for example. The display 164 is an external cathode-ray tube (CRT) or an external liquid-crystal display (LCD). If a player (not shown) for CD or DVD, or a recorder and player (not shown) for CD-R, CD-RW, or recordable DVD is included in the system of FIG. 4, data is read from a recording medium, and data is recorded onto a recordable recording medium.

As previously discussed, each of the servers 1 and 2 is connected to the LAN 6 through the terminal 11 and the communication unit 12, and performs the UPnP functions. With own apparatus connected to the network, data is exchanged via the network. More specifically, each of the servers 1 and 2 receives a variety of data transmitted thereto via the LAN 6, and stores the data in the content storage hard disk 13. In response to a request to send content from an electronic apparatus, the servers 1 and 2 read requested data from the content storage hard disk 13, and transmits the data through the communication unit 12 and the terminal 11, thereby delivering the requested data to the electronic apparatus.

In this preferred embodiment, the communication unit 12 of each of the servers 1 and 2 is intelligent with CPU thereof installed therewithin. As shown in FIG. 5, the communication unit 12 includes a communication interface 111 and a controller 112. The controller 112 includes a CPU 121, an ROM 122, an RAM 123, a flash memory 124, and an interface 125.

The communication interface 111, controlled by the controller 112, converts received data in a predetermined format into data in a format processable by own apparatus, and supplies the format converted data to the controller 15 through the interface 125. The communication interface 111 also converts data from own apparatus into data in a transmission format, and then outputs the resulting data. The communication interface 111, controlled by the controller 112 in the communication unit 12, also performs processes in compliance with Ethernet®, such as detecting the presence of a signal in the LAN 6 (in a carrier detection operation), and detecting a collision of transmission data (transmission packet).

The ROM 122 in the controller 112 in the communication unit 12 stores a program executed by the controller 112 and data required in processes. The RAM 123 serves as a working area in a variety of processes of the controller 112. The flash memory 124 is a reprogrammable non-volatile memory, and stores a variety of setting parameters relating to communication during a power-off period.

Figure 6:
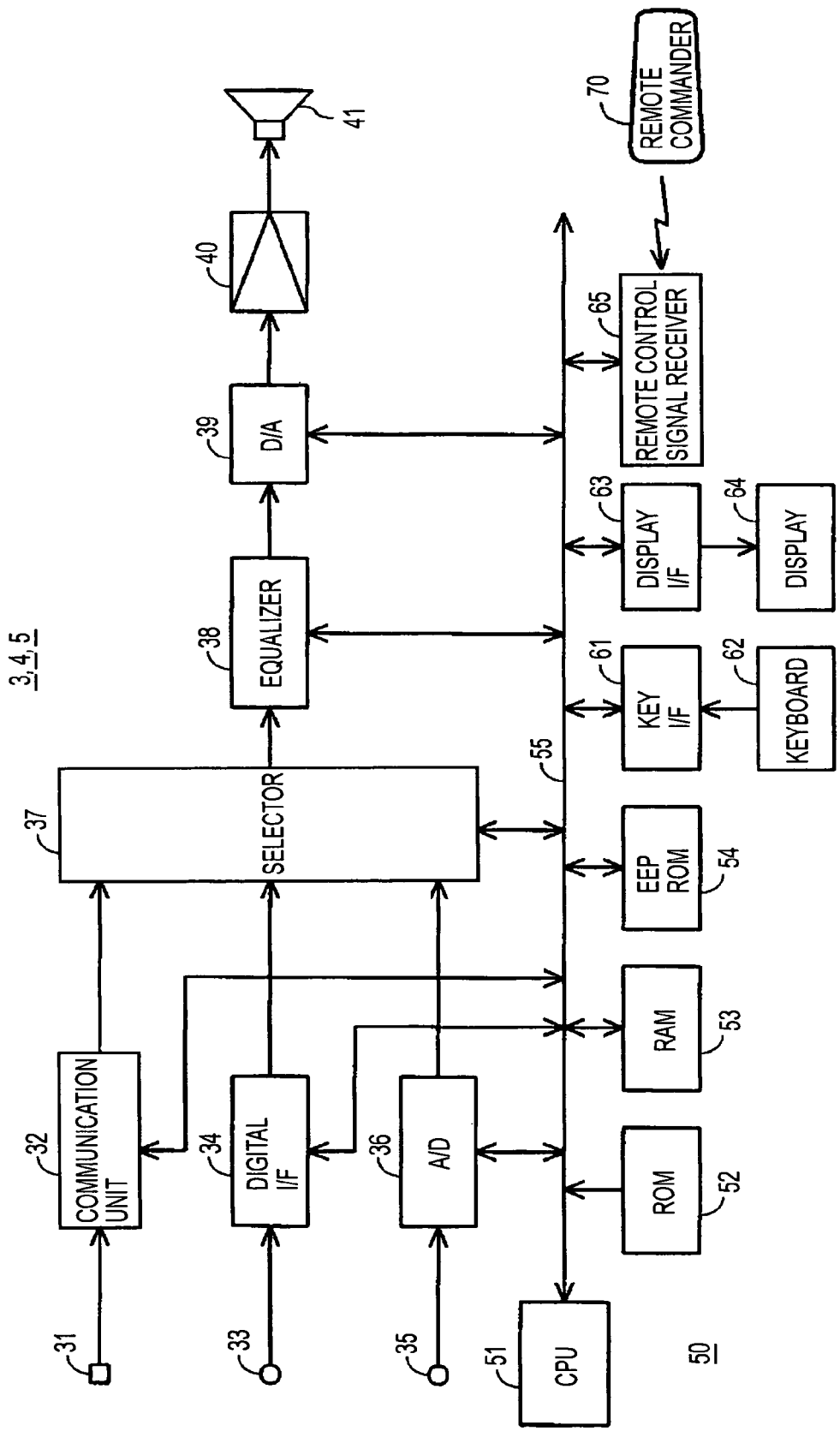
FIG. 6 is a block diagram illustrating the structure of an audio playing apparatus.

The audio playing apparatuses 3, 4, and 5 of this preferred embodiment are described below. FIG. 6 is a block diagram illustrating the structure of each of the audio playing apparatuses 3, 4, and 5. As shown in FIG. 6, each of the audio playing apparatuses 3, 4, and 5 includes a connection terminal 31 for connection with the LAN 6, a communication unit 32, a digital input terminal 33, a digital interface 34, an analog input terminal 35, an analog-to-digital (A/D) converter 36, a selector 37, an equalizer 38, a digital-to-analog (D/A) converter 39, an audio amplifier 40, a loudspeaker 41, and a controller 50.

The controller 50 controls the blocks in each of the audio playing apparatuses 3, 4, and 5, and is a microcomputer including a CPU 51, an ROM 52, an RAM 53, and an EEPROM 54, all mutually connected by a CPU bus 55.

The ROM 52 stores a program executed by the CPU 51, and data required in processes. The RAM 53 serves as a working area for a variety of process of the CPU 51. The EEPROM 54 is a non-volatile memory, and stores a variety of data that must be stored even while power of the audio playing apparatuses 3, 4, and 5 is cut off.

As shown in FIG. 6, a keyboard 62 is connected to the controller 50 through a key interface 61. The keyboard 62, including variety of keys, generates an electrical signal in response to an operational input entered by the user, and supplies the electrical signal to the controller 50 via the key interface 61.

A remote control signal receiver 65 receives an infrared remote control signal from a remote commander 70 as a remote control unit, converts the remote control signal into an electrical signal, and supplies the electrical signal to the controller 50. The remote commander 70, including a variety of operation keys, receives an operational input from the user, and produces a remote control signal in response to the operational input, and outputs the remote control signal.

Each of the keyboard 62 and the remote commander 70 includes arrow keys for moving a cursor, an enter key, and other operation keys. Using the keyboard 62 and the remote commander 70, the user inputs a variety of operational inputs, for example, requests a content list, selects a desired digital content selected from the content list, inputs adjustment control commands for volume level and voice quality. The operational inputs are then transferred to the controller 50. In response to the instruction from the user, the controller 50 controls each block in the apparatus.

A display 64 is connected to the controller 50 through a display interface 63. The display 64 is a display device, such as an LCD or an organic electroluminescence device. The display 64 displays a variety of display information including guidance messages, error messages, status display, etc. in response to a display signal from the display interface 63.

As the communication unit 12 in each of the servers 1 and 2, the communication unit 32 performs the UPnP functions, thereby connecting own apparatus to the network and exchanging data via the network. The communication unit 32 converts data addressed thereto and received through the connection terminal 31 into data in a format processable by own apparatus. If the received data addressed to own apparatus is audio data, the received data is supplied to the selector 37. If the received data addressed to own apparatus is control data, the received data is supplied to the controller 50.

The communication unit 32, controlled by the controller 50, produces a command to be transmitted to a target electronic apparatus, and transmits the command to the target electronic apparatus via the LAN 6. The communication unit 32 also performs the function of Ethernet®, such as carrier detection and collision detection.

Digital audio signals supplied through the digital input terminal 33 from a variety of outside digital information processing apparatuses are fed to the digital interface 34. The digital interface 34 converts the digital audio data into data in a format processable by own apparatus, and then supplies the format converted digital data to the selector 37.

Analog signals supplied through the analog input terminal 35 from a variety of outside audio apparatuses are fed to the A/D converter 36. The A/D converter 36 converts the analog audio data supplied thereto into a digital signal in a predetermined format, and supplies the resulting signal to the selector 37.

The selector 37, controlled by the controller 50, selects one from the audio data from the communication unit 32, the audio data from the digital interface 34, and the audio data from the A/D converter 36, and outputs the selected audio data. The controller 50 controls the selector 37 in response to the command from the user received from the keyboard 62 through the key interface-61 or from the remote commander 70 through the remote control signal receiver 65.

The equalizer 38 adjusts the audio quality of the supplied audio data under the control of the controller 15 that responds to an instruction input from the user through the keyboard 62 and the key interface 61. The audio data processed by the equalizer 38 is supplied to a digital-to-analog (hereinafter referred to as D/A) converter 39.

The D/A converter 39 converts the supplied digital audio data into an analog audio signal, and supplies the audio amplifier 40 with the analog audio signal. The audio amplifier 40, controlled by the controller 15, amplifies the analog audio signal to a predetermined level, and supplies the loudspeaker 41 with the amplified audio signal. The loudspeaker 41 thus emits a sound in response to the supplied analog audio signal.

The functions of the equalizer 38 and the D/A converter 39 can be performed by software programs executed by the controller 50.

The following three steps must be performed when the user plays an audio content stored in one of the servers 1 and 2 as media servers on one of the audio playing apparatuses 3, 4, and 5 as media renderers in the home network system of this preferred embodiment:

(1) selecting a server holding an audio content;
(2) selecting the audio content to be played; and
(3) selecting an audio playing apparatus for playing the audio content.

Since the home network system includes a plurality of servers and a plurality of audio playing apparatuses, steps (1) through (3) must be performed. However, if only a single server is included, step (1) for selecting a server becomes unnecessary. If only a single audio playing apparatus is included, step (3) for selecting an audio playing apparatus becomes unnecessary.

The procedure for audio playing becomes different depending on the apparatuses incorporating the control points. If the control point of the audio playing apparatus is used, the control point naturally functions with audio playing intended on own audio playing apparatus. In this case, the selection of the audio playing apparatus becomes unnecessary. If the control point of the server is used, the control point functions to play the content of own server, and the selection of the server can thus be eliminated.

The audio content of the server is typically played on the audio content playing apparatus through the above-referenced steps (1)-(3) in the conventional home network system. Since the selection step for selecting the audio content to be played is performed on a per audio playing apparatus basis, it is difficult to play the same audio content at the same time on a plurality of audio playing apparatuses.

In the home network system of this preferred embodiment, the same audio content held by the same server is concurrently played on a plurality of audio playing apparatuses.

A playing method is described below. In this playing method, a predetermined control point now controls a plurality of media renderers so that the plurality of media renderers play the same audio content.

As previously discussed, the UPnP apparatuses forming the home network system of this preferred embodiment have the function of the control point. Any of the UPnP apparatuses connected to the home network system can manage connection information of the apparatus in the home network system.

The server storing audio contents must concurrently control a plurality of audio playing apparatuses. Using the function of the control point, the server controls the audio playing apparatuses. For example, the server 1 installed in a living room, for example, controls the audio playing apparatuses 3, 4, and 5 installed in other rooms.

The user operates the server 1 installed in the living room in the home network system of FIG. 1, thereby selecting audio playing apparatuses to which the audio content is supplied for concurrent playing. The number of audio playing apparatuses that can be set for concurrent playing is subject to a limit, which depends on the throughput of the server 1.

The server 1 as the control point recognizes a plurality of audio playing apparatuses that, as media renderers, are set as destinations of the audio content by the user. The server 1 holds the information of the audio playing apparatuses, and transmits, to all audio playing apparatuses, the audio content the user has requested the server 1 to transmit. The server 1 also controls each audio playing apparatus receiving the audio content.

When the transmission of the requested audio content ends, the server 1 notifies all audio playing apparatuses designated as playing apparatuses of the end of the current playing. When the user intentionally suspends the concurrent playing or stops some of the audio playing apparatuses in the concurrent playing, the server 1 receives this request from the user, and stops playing the contents in response, or causes the indicated audio playing apparatuses only to stop playing the content. If some of the audio playing apparatuses become unable to play the content, the server 1 performs a play suspension process, thereby causing only these audio playing apparatuses to stop playing the content.

In this arrangement, the control point of the server 1 transmits the same audio content stored therein to the audio playing apparatuses 3, 4, and 5 as media renderers, and controls the audio playing apparatuses 3, 4, and 5 to concurrently play the same audio content.

More specifically, the server 1 concurrently transmits the same audio content to the audio playing apparatuses 3, 4, and 5 installed in rooms to allow the audio playing apparatuses 3, 4, and 5 to play the same audio content in the respective rooms. When the playing of the audio content is no longer needed in one room, the user issues a command to the server 1 to stop the transmission of the audio content to the audio playing apparatus in that room. The playing of the audio content is not performed.

The servers 1 and 2 thus concurrently transmit the same audio content to the audio playing apparatuses 3, 4, and 5, and control the audio playing apparatuses 3, 4, and 5 to concurrently play the same audio content. When a user comes to the living room, the transmission of the audio content to the audio playing apparatus of the user's own room is thus suspended.

Under the control of the server 1, the same audio content is concurrently transmitted to the audio playing apparatuses 3, 4, and 5 to play the same audio content in the rooms. When the user moves to a different room where the audio playing apparatus is installed, the user can continuously enjoy the same audio content without performing a complex operation on the audio playing apparatus.

The server 1 can select any one or two of the audio playing apparatuses 3, 4, and 5. The audio content is transmitted to the selected audio playing apparatuses for playing.

As already discussed, upon receiving the same audio content, the audio playing apparatuses as the media renderers concurrently play the same audio content. In this case, no interruption from another control point is accepted. This process is described below.

If a known UPnP apparatus is controlled by another control point in the home network system with the server 1 controlling the audio playing apparatuses 3, 4, and 5 to concurrently play the audio content, the UPnP apparatus is continuously controlled by latest control point that has controlled most recently.

In such a case, the server 1 is unable to control the audio playing apparatuses to play the same audio content. Each of the audio playing apparatuses stores the control point that has commanded the audio playing apparatuses to concurrently play the same audio content. A command from another control point is left unexecuted in the middle of the concurrent playing of the audio content.

More specifically, upon receiving the command of concurrent playing of the audio content, each of the audio playing apparatuses 3, 4, and 5 extracts identification information of the control point contained in the received command information (in this case, identification information of the server 1), stores the identification information in the RAM 53 or the EEPROM 54, and responds to a request from the server 1 only.

In this way, the user continues playing of the audio content within the concurrent playing period. When the concurrent playing period ends, the server 1 as the control point transmits a notification of the end of the content playing to each audio playing apparatus. In response, each audio playing apparatus releases the designation of the enabled control point, thereby enabling all control points to control the audio playing apparatus.

When another control point issues a command, attempting to perform control an audio playing apparatus during the concurrent playing, the audio playing apparatus disables a process responsive to the command while generating reply information to the other control point to notify that the issued command is inexcutable. The reply information is thus transmitted to the other control point.

When the other control point is unable to perform the command issued from own apparatus, the other control point could mistake the rejected control for a disorder of the apparatus. This arrangement eliminates this possibility.

When the server 1 controls the audio playing apparatuses 3, 4, and 5 to concurrently play the audio content thereof on the audio playing apparatuses 3, 4, and 5, the audio content may be concurrently played again under the same conditions in the home network system for the next time thereafter.

As already discussed, under the control of the server 1, the audio playing apparatuses 3, 4, and 5 can concurrently play the audio content of the server 1. If concurrent playing of the audio content on a plurality of audio playing apparatuses is always intended, it is inconvenient for the user to enter setting for concurrent playing and select target apparatuses each time the audio playing apparatuses are used.

The server 1 in the home network system of this preferred embodiment stores, in a predetermined memory, the content of setting relating to the audio playing apparatuses that perform concurrent playing of the audio content when a command to concurrently play the audio data is issued.

The server 1 stores the setting information relating to the target audio playing apparatuses in the flash memory 124 in the communication unit 12 of FIG. 5. The flash memory 124 stores a program for operating the communication unit 12. Stored in an area different from a program storage area in the flash memory 124 are the identification information of the server as a media server the user has instructed to perform the concurrent playing operation, and the identification information of the audio playing apparatus as a media renderer for performing the concurrent playing of the audio content.

The identification information of each apparatus can be a device description or a service description of each UPnP apparatus, or a media access control (MAC) address of each UPnP apparatus.

Since the flash memory 124 stores the information concerning the server as a media server for providing the audio content and the audio playing apparatus as a media renderer for concurrently playing the audio content, the UPnP apparatus in the home network system is used under the same setting at each use.

As described above, the control point controls a plurality of media renderers, each media renderer limits the control points, and the control point and the media renderer for performing concurrent playing are registered. In this arrangement, a plurality of audio playing apparatuses concurrently play the same content stored in a predetermined server.

The operation of the server 1 and the audio playing apparatuses 3, 4, and 5 for stream playing is now described. The stream playing is performed when the server 1 transmits the same audio content to a plurality of audio playing apparatuses.

Figure 7:
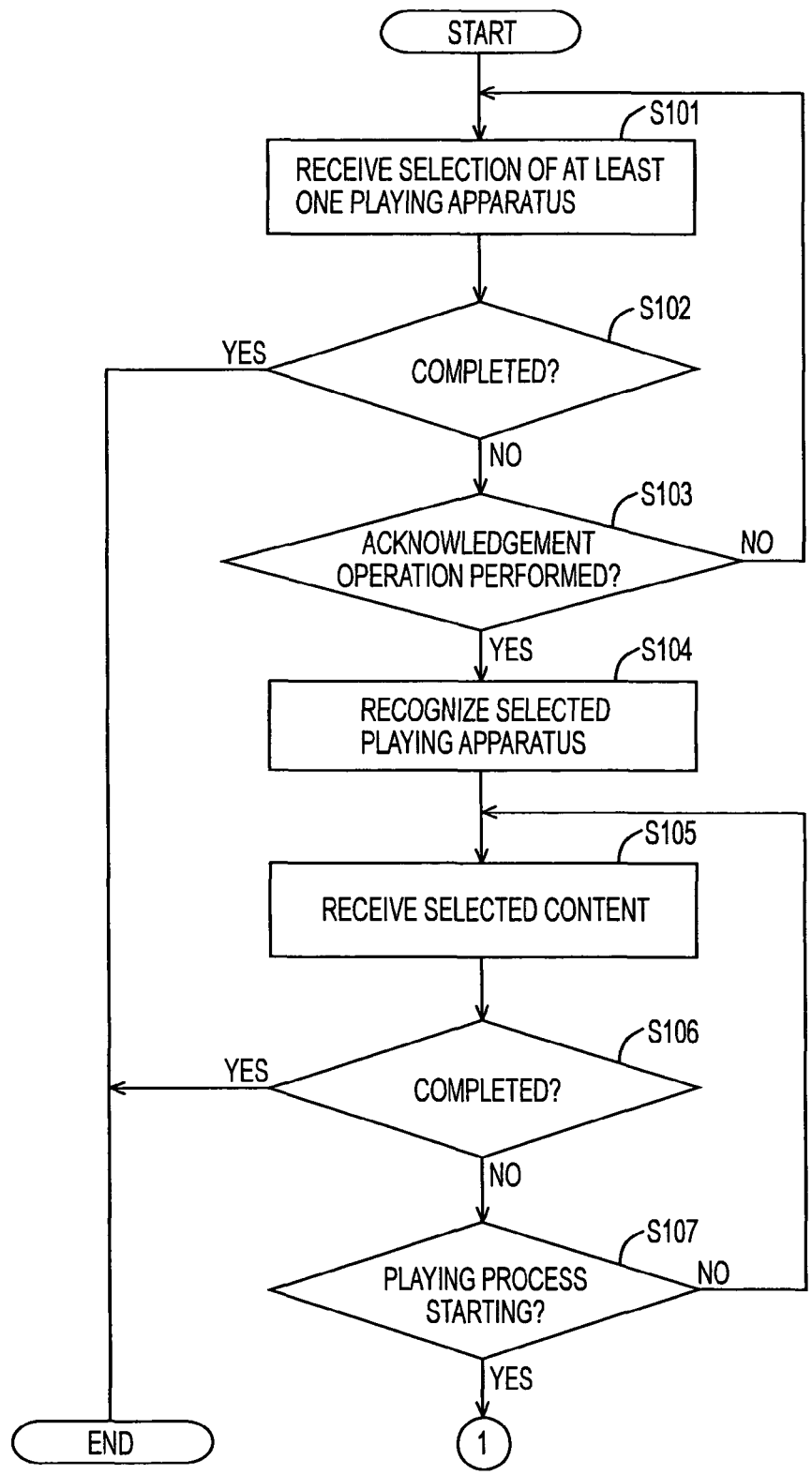
FIG. 7 is a flowchart illustrating the operation of the server.
Figure 8:
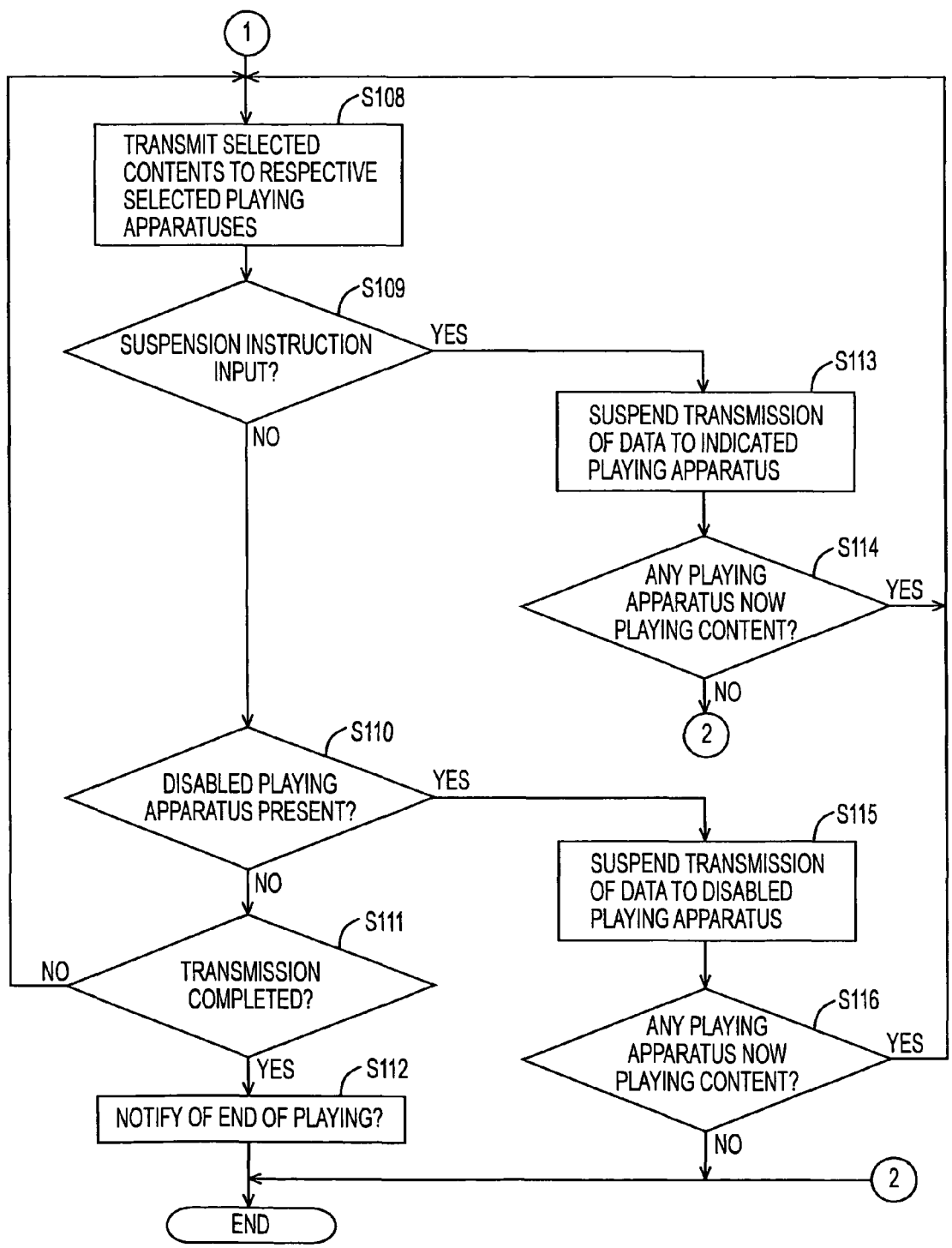
FIG. 8 is a continuation of the flowchart of FIG. 7.

The operation of the server 1, working as a control point and a media server in the home network system of the preferred embodiment, is described below. FIGS. 7 and 8 are flowcharts illustrating the operation of the server 1 that performs concurrent playing of contents. The process illustrated in FIGS. 7 and 8 is performed mainly by the controller 15 in the servers 1 and 2 when the server 1 receives a command input to cause a plurality of audio playing apparatuses to perform concurrent playing of the audio contents.

When the server 1 receives the command input to cause the plurality of audio playing apparatuses to perform the concurrent playing of the audio contents, the controller 15 in the server 1 accepts, through the keyboard 162, the selection of at least one audio playing apparatus performing concurrent playing (step S101). The server 1 in this preferred embodiment, having the function of the control point, knows the apparatuses connected to the home network system. The server 1 thus displays a list of selectable players on the display 164, thereby allowing the user to select at least one audio playing apparatus for performing concurrent playing.

A plurality of audio playing apparatuses are not necessarily selected in step S101. Selecting one target audio playing apparatus is also effective. In this case, the audio content is played on the single audio playing apparatus.

The controller 15 determines whether a command to end the concurrent playing is issued (step S102). More specifically, the controller 15 determines in step S102 whether the command to end the process shown in FIGS. 7 and 8 is input by performing a predetermined end process such as selecting an end icon. If it is determined in step S102 that the command to end the process is input, the concurrent playing of the audio content on the plurality of audio playing apparatuses as shown in FIGS. 7 and 8 ends. If it is determined in step S102 that the command to end the process is not input, the controller 15 determines in step S103 whether an acknowledgement input is received.

More specifically, the controller 15 determines in step S103 whether a predetermined acknowledgement operation for ending input, such as selecting an acknowledgement icon, is performed in an selection input process of the audio playing apparatus for performing the concurrent playing in step S101. If it is determined in step S103 that the predetermined acknowledgement operation is performed, the controller 15 determines that the selection input process is in progress, and repeats processing, starting step S101.

If it is determined in step S103 that the predetermined acknowledgement input is received, the controller 15 determines that the selection input process of the audio playing apparatus for performing concurrent playing has been completed. The controller 15 then recognizes the audio playing apparatus selected as the concurrent playing apparatus (step S104). Through the keyboard 162, the controller 15 receives the selected audio content to be played (step S105).

In step S105, the controller 15 displays, on the display 164, a list of audio contents stored in the content storage hard disk 13 of own apparatus, thereby prompting the user to search for a target audio content, to select and to input the target audio content.

The controller 15 in the server 1 determines here again in step S106 whether the command to end the concurrent playing process is input. The determination in step S106 is performed in the same manner as in step S102. If it is determined in step S106 that the command to end the process is input, the concurrent playing of the audio content on the plurality of audio playing apparatuses shown in FIGS. 7 and 8 is terminated. If it is determined in step S106 that the command to end the concurrent playing is not input, the controller 15 determines in step S107 whether a start command of an audio content is input.

If it is determined in step S107 that the command to start the playing of the audio content is not input, the controller 15 determines that the selection of the content to be concurrently played is not completed, and repeats processing, starting with step S105. If it is determined in step S107 that the command to start the playing of the audio content is input, the controller 15 proceeds to step S108 of FIG. 8. The controller 15 transmits the audio content selected to be concurrently played to each of the audio playing apparatuses selected as apparatuses performing the concurrent playing (step S108).

The controller 15 determines in step S109 whether a suspension command is received through the keyboard 162. If it is determined in step S109 that a suspension command is not received, the controller 15 determines in step S110 whether an audio playing apparatus, selected as the one performing the concurrent playing but providing no response .and considered unable to play the audio content, is present.

If it is determined in step S110 that any audio playing apparatus unable to play the audio content is not present, the controller 15 determines in step Sill whether the transmission of all requested audio contents is completed. If it is determined in step Sill that the transmission of all requested audio contents is not completed, the controller 15 repeats processing, starting with step S108 until the transmission of the audio contents requested for concurrent playing is completed.

If it is determined in step Sill that the transmission of the audio contents requested for concurrent playing is completed, the controller 15 in the server 1 notifies each of the audio playing apparatuses selected for concurrent playing of the end of playing (step S112). The process of FIGS. 7 and 8 ends.

If it is determined in step S109 that a suspension command is received, the controller 15 suspends the transmission of the audio content to the audio playing apparatus to which the suspension command is intended (step S113). The controller 15 determines in step S114 whether any audio playing apparatus performs the playing operation even after the audio playing apparatuses are instructed to suspend the playing operation.

If it is determined in step S114 that any audio playing apparatus performing the playing operation is present, the controller 15 performs processing, starting with step S108, and continuously transmits the audio content to audio playing apparatuses other than the audio playing apparatuses that are instructed to suspend the playing operation. If it is determined in step S114 that none of the audio playing apparatuses are playing the audio content, in other words, that all audio playing apparatuses suspend the playing operation, the process of FIGS. 7 and 8 ends.

If it is determined in step S110 that any audio playing apparatus disabled in playing the content is present, the controller 15 stops transmitting the audio content to the disabled audio playing apparatus (step S115). The controller 15 determines whether any audio playing apparatus performing the playing operation is present even after the disabled audio playing apparatus is instructed to stop the playing operation (step S116).

If it is determined in step S116 that any audio playing apparatus performing the playing operation is present, the controller 15 repeats processing, starting with step S108 to continuously transmit the audio content to the audio playing apparatus that normally plays the audio content. If it is determined in step S116 that any audio playing apparatus performing the playing operation is not present, in other words, that none of the audio playing apparatuses are playing the audio content, the process of FIGS. 7 and 8 ends.

In response to a command received from the user through the keyboard 162 or the remote commander 70, the server 1, as a control point and a media server, transmits a desired audio content to each of at least one selected audio playing apparatus. At least one audio playing apparatus thus plays the same audio content.

The audio content is transmitted in a packet thereof to at least one audio playing apparatus. For each of the selected audio playing apparatuses, a packet containing the identification information of the audio playing apparatus is constructed and transmitted.

The packets different in the identification information of a transmission destination but having the same audio content are constructed in number equal to the number of selected audio playing apparatuses and transmitted to respective audio playing apparatuses. The audio playing apparatus receives only the packet (containing the identification information of own apparatus) addressed thereto to play the audio content. If any audio playing apparatus must stop the playing operation, a packet addressed thereto is left unmade.

A packet containing the identification information of all selected audio playing apparatuses can be constructed and then transmitted to the audio playing apparatuses. In this case, the audio playing apparatus receives the packet containing the identification information of own apparatus and plays the audio content. If any audio playing apparatus must stop playing the audio content, the server 1 constructs a packet containing no identification information of that audio playing apparatus.

Figure 9:
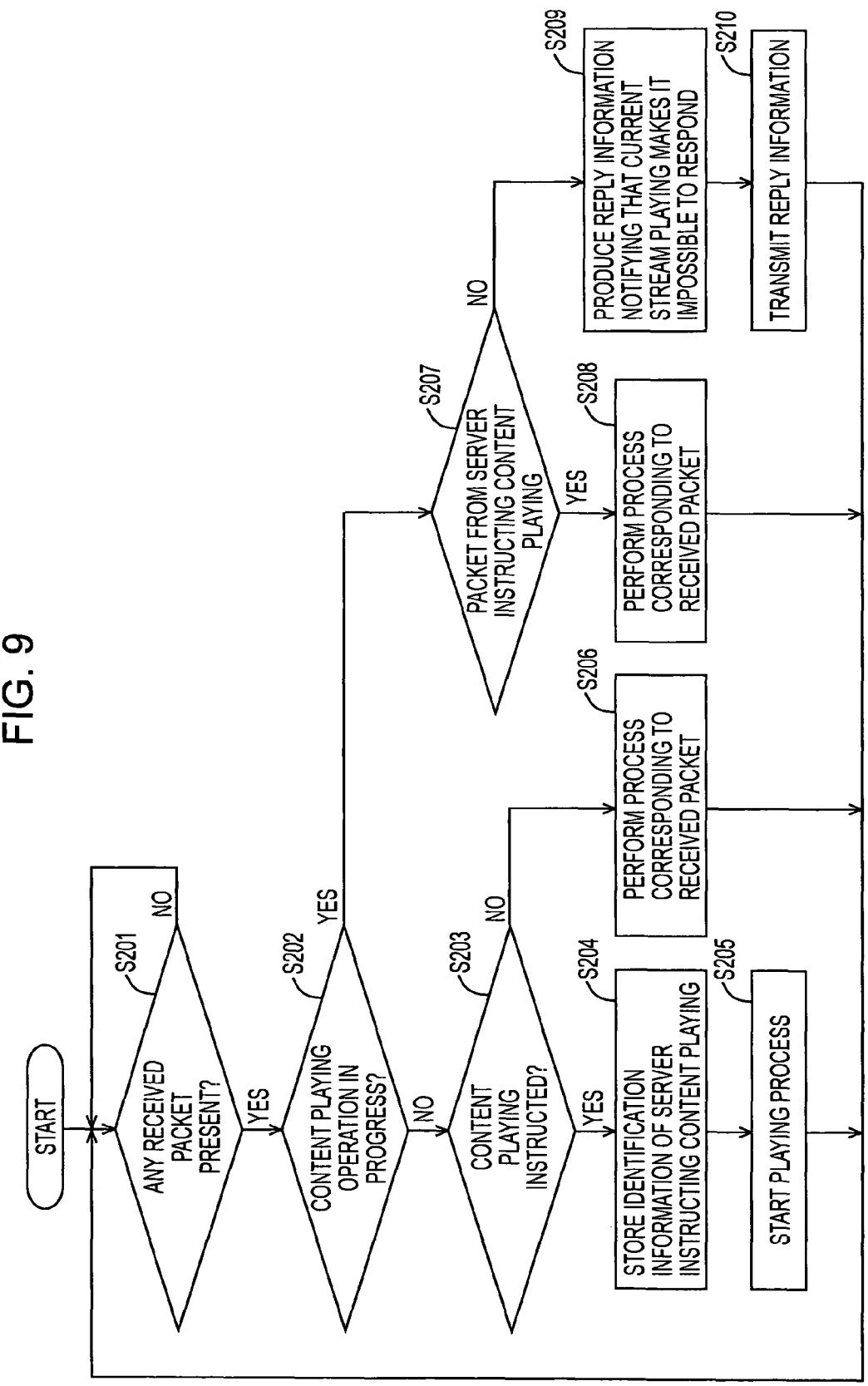
FIG. 9 is a flowchart illustrating the operation of the audio playing apparatus.

The operation of the audio playing apparatuses 3, 4, and 5 as media renderers receiving the audio content from the server 1 and replaying the audio content is described below. FIG. 9 is a flowchart illustrating the operation of the audio playing apparatuses 3, 4, and 5 for processing packet data transmitted via the LAN 6. To simplify explanation, the operation of the audio playing apparatus 3 only is described. The same operation is performed in other audio playing apparatuses designated for concurrent playing.

When the audio playing apparatus 3 is connected to the LAN 6 and switched on, the controller 50 in the audio playing apparatus 3 performs a process of FIG. 9. The controller 50 in the audio playing apparatus 3 waits on standby for a packet addressed thereto (step S201). Upon receiving the packet addressed thereto, the controller 50 in the audio playing apparatus 3 determines in step S202 the status of own apparatus, i.e., as to whether the playing of the audio content is in progress.

If it is determined in step S202 that the playing of the audio content is not in progress, the controller 50 determines in step S203 whether the received packet requires the playing of the audio content. If it is determined in step S203 that the received packet requires the playing of the audio content, the controller 50 extracts the identification information of a transmission source from the received packet. The controller 50 stores the identification information in one of the RAM 53 and the EEPROM 54 (step S204), controls each block to shift to a playing mode, and starts stream playing an audio content being received (step S205). The controller 50 repeats processing, starting with step S201.

If it is determined in step S203 that the received packet does not require the playing of the content playing, the controller 50 performs another process in accordance with the received packet (step S206), and repeats processing, starting with step S201.

If it is determined in step S202 that the audio content playing is in progress, the controller 50 compares the identification information of the transmission source contained in the received packet with the identification information, stored in step S204, of the server that is a provider of the currently stream playing audio content. The controller 50 thus determines in step S207 whether the received packet is from the provider of the audio content (server requiring content playing).

If it is determined in step S207 that the received packet is from the provider of the audio content currently being played, the controller 50 performs a process in accordance with the received packet, such as stream playing the audio packet (step S208), and then repeat processing, starting with step S201.

If it is determined in step S207 that the received packet is not from the provider of the audio content currently being played, the controller 50 rejects the packet. The controller 50 produces reply information to the effect that the audio playing apparatus 3 is unable to respond to the received packet because the stream playing of the audio content is currently in progress (step S209). The controller 50 then transmits the reply information to the transmission source that has transmitted the rejected packet (step S210), and repeats processing, starting with step S201.

The process of FIG. 9 has been discussed with reference to the audio playing apparatus 3. The same process is also performed on each of the remaining audio playing apparatuses 4 and 5. Each of the audio playing apparatuses 3, 4, and 5 receives the same audio content from a predetermined server (the server 1 in this preferred embodiment), and concurrently plays the same audio content.

While the audio playing apparatus 3 stream plays the audio content, the audio playing apparatus 3 processes no packet from the server other than the provider of the audio content. Interruptions are prevented during the stream playing, and the stream playing of the audio content is continuously performed with higher priority placed and without being suspended.

In this preferred embodiment, the server 1 designates at least one audio playing apparatus to transmit an audio content thereto, and the designated audio playing apparatus plays the audio content. The user designates the audio playing apparatus and the audio content. Each time, the user may wish to transmit the audio content to the same audio playing apparatuses.

Another type of server is described below. The server stores information concerning the designated audio playing apparatus and information concerning the transmitted audio content. The server is thus free from the repetition of the same designation process in the case when the audio content is transmitted to the same audio playing apparatus.

In this case as well, the home network system of FIG. 1 is used. The servers 1 and 2, and the audio playing apparatuses 3, 4, and 5 have the same structure previously discussed with reference to FIGS. 4 through 6. As will be described below, the process of the server for transmitting the audio content is different from the process of the above-described server.

FIG. 10 is a flowchart of the server 1 that transmits an audio content to at least one audio playing apparatus. As previously discussed with reference to FIG. 7, the process of FIG. 10 is mainly performed by the controller 15 in the server 1 when the server 1 receives a command to cause a plurality of audio playing apparatuses to concurrently play the audio content.

As the process of FIG. 7, the process of FIG. 10 is followed by the process of FIG. 8. The process of FIG. 10 is performed by the server at the same timing for the same purpose as those of the process of FIG. 7. In the process of FIG. 10, steps identical to those described with reference to FIG. 7 are designated with the same step numbers to simplify explanation. In this case, also, the server 1 transmits the audio content to at least one audio playing apparatus.

Upon receiving a command to perform the concurrent playing of the audio content on the plurality of audio playing apparatuses, the controller 15 in the server 1 references the flash memory 124 in the communication unit 12 of own apparatus in step S301, and determines in step S302 whether a setting for the transmission of the audio content is already present.

If it is determined in step S302 that the setting for the transmission of the audio content is already present, the controller 15 causes the display 164 to display setting information of the content of the setting through the display interface 163. The controller 15 is thus prepared to receive an input to update the setting information through the keyboard 162 in step S303. The controller 15 then determines in step S304 whether the input to update the setting information is entered.

If it is determined in step S304 that no update is required, the controller 15 proceeds to step S108 of FIG. 8 to transmit the audio content in the existing setting stored in the flash memory 124. If it is determined in step S304 that an input to update the setting information is entered, the controller 15 receives the selection of at least one audio playing apparatus for concurrent playing (step S101).

In this case, as well, the server 1 has the function as a control point, and knows the apparatuses connected to the home network system. The controller 15 shows a list of selectable audio playing apparatuses on the display 164 to prompt the user to select at least one audio playing apparatus for concurrent playing.

A plurality of audio playing apparatuses are not necessarily selected in step S101. Selecting one target audio playing apparatus is also effective. In this case, the audio content is played on the single audio playing apparatus.

The controller 15 determines whether a command to end the concurrent playing is issued (step S102). More specifically, the controller 15 determines in step S102 whether the command to end the process shown in FIGS. 7 and 8 is issued by performing a predetermined end process. If it is determined in step S102 that the command to end the process is issued, the concurrent playing of the audio content on the plurality of audio playing apparatuses as shown in FIGS. 7 and 8 ends.

If it is determined in step S102 that the command to end the process is not issued, the controller 15 determines in step S103 whether an acknowledgement input is received. If it is determined in step S103 that a predetermined acknowledgement process is not performed, the controller 15 determines that the input of the selection is in progress, and repeats processing, starting with step S101. If the audio playing apparatuses are set as the transmission destination with no updating required, simply performing the acknowledgement operation validates the existing setting.

If it is determined in step S103 that the predetermined acknowledgement process is performed, the controller 15 recognizes the audio playing apparatuses selected as the apparatuses for performing concurrent playing (step S104). Through the keyboard 162, the controller 15 receives the selected audio content to be played (step S105).

In step S105, the controller 15 displays, on the display 164, a list of audio contents stored in the content storage hard disk 13 of own apparatus, thereby prompting the user to search for a target audio content, to select and input the target audio content.

The controller 15 in the server 1 determines in step S106 whether a command to end the concurrent playing process is input. The determination in step S106 is performed in the same manner as in step S102. If it is determined in step S106 that the command to end the process is input, the concurrent playing of the audio content on at least one audio playing apparatuses shown in FIGS. 10 and 8 is terminated. If it is determined in step S106 that the command to end the concurrent playing is not input, the controller 15 determines in step S107 whether a command to start an audio content is input.

If it is determined in step S107 that the command to start the playing of the audio content is not input, the controller 15 determines that the selection of the content to be concurrently played is not completed, and repeats processing, starting with step S105. If it is determined in step S107 that the command to start the playing of the audio content is input, the controller 15 proceeds to step S305.

In step S305, the controller 15 controls the communication unit 32, thereby storing in the flash memory 124 in the communication unit 12 the identification information of at least one audio playing apparatus as a destination of the audio content and the identification information of the audio content selected as a content to be transmitted.

The controller 15 proceeds to step S108, thereby transmitting the audio content selected to be concurrently played to each of the audio playing apparatuses selected as apparatuses performing the concurrent playing.

In this case, if the flash memory 124 in the server 1 stores the setting of at least one audio playing apparatus and the setting of the audio content, these settings are continuously used without the need for entering a setting again when the audio content is concurrently played on the audio playing apparatuses.

The destination of the audio content and the audio content to be transmitted can be modified. The modified information can be newly stored in the flash memory 124 in the server 1. If there is no need for modifying the audio content and the destination thereof, the same audio content is transmitted to at least one audio playing apparatus, which has already been set, to play the audio content on the audio playing apparatus.

In the above discussion, the server 1 has the function of a control point, and transmits the audio content. The present invention is not limited to this arrangement. The present invention is equally applicable when the server 2 transmits the audio content.

In this preferred embodiment, each of the audio playing apparatuses 3, 4, and 5 also has the function as a control point. Each of the audio playing apparatuses 3, 4, and 5 instructs the server 1 or 2 to set an audio content and a destination thereof, thereby allowing a plurality of audio playing apparatuses to concurrently play the audio content.

When the audio playing apparatus has a playing function of a compact disk (CD), a magneto-optical disk (MD), or a digital versatile disk (DVD), the audio playing apparatus itself functions as a server of audio contents. In this case, the process of FIGS. 7 and 8, or the process FIGS. 10 and 8 can be performed by such an audio playing apparatus.

In the above-referenced embodiment, the audio playing apparatus performing the concurrent playing operation rejects an interrupt if another server attempts to interrupt the concurrent playing operation. In the case of an interrupt, the apparatus automatically rejects. Alternatively, the user may enter setting in each audio playing apparatus as to whether to reject or permit an interrupt.

In the above-referenced embodiment, the audio playing apparatus performing the concurrent playing operation rejects an interrupt if another server attempts to interrupt the concurrent playing operation. The present invention is not limited to the automatic rejection of interrupt.

For example, when an audio playing apparatus having the CD playing function plays an audio content on own apparatus, the audio playing apparatus can reject an interrupt if the interrupt occurs in any process of each audio playing apparatus.

The replay information is transmitted to another server in response to an interrupt from the other server. The request of the interrupt may be simply left unanswered. In such a case, the other server that has attempted to interrupt may withdraw the interrupt request if no replay is received within a predetermined period of time.

In this way, the rejection function of rejecting the interrupt request is not limited to the process in which the request is rejected and the requesting server is notified of the fact of the rejection, but also the process in which the received request is simply neglected with nothing done. If the request is simply neglected, the requesting server may take a predetermined step, such as counting time-out time for reply.

When the audio content is transmitted to each of the audio playing apparatuses, the server may delay the audio content in transmission timing depending on characteristics of the audio playing apparatuses and playing conditions of the audio content. In this way, the playing environments of the audio playing apparatuses are regulated.

For example, using a ping program, the server may transmit a predetermined command to the audio playing apparatus as a destination of an audio content, and measures time until the server receives a reply from the audio playing apparatus. The server thus measures the transmission time of the audio content, and based on the result of the measurement, the server adjusts the transmission timing of the audio content to each audio playing apparatus. Synchronization is thus established in the playing of the audio content on all audio playing apparatuses receiving the audio content. In this way, a duration of time out of synchronization falling within a range of a few milliseconds to a few tens of milliseconds among the audio playing apparatuses can be corrected.

As previously discussed, the servers 1 and 2 have the function as an information transmission apparatus, and the audio playing apparatus has the function of an information usage apparatus. The function of a destination information receiving unit of the information transmission apparatus is carried out by the key interface 161 and the keyboard 162 of each of the servers 1 and 2.

When another electronic apparatus is used as a control point, the communication unit 12 of the server performs the function of the destination information receiving unit that receives the setting information supplied via the network. The function of a concurrent transmission unit and the function of an end notification unit, in the information transmission apparatus, are performed by the communication unit 12 and the controller 15 in cooperation with each other.

The function of a receiving unit in the information usage apparatus is performed by the communication unit 32. The function of a processing unit in the information usage apparatus is performed by each of the controller 50, the equalizer 38, and the D/A converter 39. The function of an identification information storage unit in the information usage apparatus is performed the EEPROM 54 in the audio playing apparatus. The function of a control unit in the information usage apparatus is performed by the communication unit 32 or the controller 50 in cooperation with the communication unit 32. The function of a production unit in the information usage apparatus for producing the reply information is performed by the controller 50 or the communication unit 32 in cooperation with the controller 50. The function of a transmission unit in the information usage apparatus is performed by the communication unit 32.

The function of a storage unit in the information transmission apparatus is performed by the flash memory 124 in the communication unit 12 of each of the servers 1 and 2.

A computer program for transmitting information is installed on the information transmission apparatus, such as a computer, connected to the network. The computer program includes a method including a transmission destination designation step for designating at least one information usage apparatus as a destination of information signal to an information transmission apparatus, a concurrent transmission step for transmitting the same information signal to the information usage apparatus designated in the transmission destination designation step, and an end notification step for notifying the designated information usage apparatus of the end of transmission of the information signal when the transmission of the information signal is completed.

The computer program further includes a storing step for storing identification information of at least one information usage apparatus designated as the destination of the information signal. Using the identification information of the information usage apparatus stored in the storing step, the transmission of the information signal is repeatedly transmitted to the same information usage apparatuses.

Such a computer program is sold or distributed together with the information usage apparatus, such as an audio playing apparatus. The computer program is installed in an apparatus, such as personal computer connected to the home network system and functioning as a server. The present invention is thus relatively easily applied to a variety of home network systems.

The home network system has been discussed for exemplary purposes only. There is no limitation to the number of servers and the number of audio playing apparatuses. The present invention is applicable to a variety of combination of servers and apparatuses.

To simplify explanation, the audio content is transmitted to stream play the audio content. The present invention is not limited to the stream playing. The present invention is applicable to the transmission of AV contents, such as movies, still image data, and moving image data.

In the above-referenced embodiment, the present invention is applied to the home network system employing the UPnP apparatuses. The present invention is not limited to the UPnP. The present invention is applicable to network systems of any of variety of specifications including Java® intelligent network infrastructure (Jini), and home audio/video interoperability (HAVi).

The present invention is applicable to any of a variety of networks, each including a server that transmits a variety of contents including audio contents and AV contents, and a client device that receives the variety of contents from the server and uses the contents by playing.

What is claimed is:

1. A method for transmitting audio content comprising:
designating, with a controller device, a plurality of audio playing apparatuses as recipients of the audio content to be transmitted by an information transmission apparatus;
concurrently transmitting over a wired local area network, from the information transmission apparatus to the plurality of audio playing apparatuses designated in the act of designating, at least one packet comprising:
identification information for at least one of the plurality of audio playing apparatuses indicating a recipient of the packet;
at least a portion of the audio content; and
control information requiring the playing of the audio content by the at least one of the plurality of audio playing apparatuses such that the at least one of the plurality of audio playing apparatuses is instructed to play the audio content concurrently with receiving the audio content;
if a rejection message is received from a particular audio playing apparatus of the plurality of audio playing apparatuses, the rejection message identifying that the at least one packet has been rejected by the particular audio playing apparatus, performing a play suspension process to refrain from transmitting further packets to the particular audio playing apparatus;
for each audio playing apparatus of the plurality of audio playing apparatuses from which no rejection message was received, transmitting at least one further packet comprising the identification information, at least another portion of the audio content, and the control information; and
notifying each of the plurality of audio playing apparatuses to which the transmission of the audio content is completed of an end of transmission of the audio content.

2. The method according to claim 1, further comprising:
storing identification information of the information transmission apparatus, said identification information extracted from an information signal sent from the information transmission apparatus, when the plurality of audio playing apparatus receives the information signal; and
rejecting a request of an electronic apparatus having identification information different from the identification information stored in the identification storage step when the plurality of audio playing apparatuses receives the information signal.

3. The method according to claim 2, further comprising:
producing reply information which is to be transmitted to the electronic apparatus that is identified by the identification information contained in the request that is rejected in the control step; and
transmitting the reply information produced in the production step to the electronic apparatus.

4. The method according to claim 1, wherein the act of instructing is performed in response to an instruction from a user.

5. The method according to claim 1, further comprising storing identification information of at least one audio playing apparatus designated as a recipient of the audio content, wherein the identification information of the at least one audio playing apparatus stored in the act of storing is used to repeatedly transmit the audio content to the at least one audio playing apparatus.

6. A system for transmitting audio content comprising:
an information transmission apparatus; and
a plurality of audio playing apparatuses;
wherein the information transmission apparatus comprises at least one first processor programmed to perform acts of:
receiving destination information designating the plurality of audio playing apparatuses as recipients of audio content,
concurrently transmitting over a wired local area network, to the plurality of audio playing apparatuses designated in the destination information, at least one packet comprising:
identification information for at least one of the plurality of audio playing apparatuses indicating a recipient of the packet;
at least a portion of the audio content; and
control information requiring the playing of the audio content by the at least one of the plurality of audio playing apparatuses such that the at least one of the plurality of audio playing apparatuses is instructed to play the audio content concurrently with receiving the audio content, receiving a rejection message from an audio playing apparatus of the plurality of audio playing apparatuses, the rejection message identifying that the at least one packet has been rejected by the audio playing apparatus, refraining from transmitting further packets to the audio playing apparatus from which the rejection message is received, and notifying each of the plurality of audio playing apparatuses to which the transmission of the audio content is completed of an end of transmission of the audio content; and wherein each of the plurality of audio playing apparatuses comprises at least one second processor programmed to perform acts of:

receiving the packet including the audio content from the information transmission apparatus, processing the audio content storing identification information of the information transmission apparatus transmitting the packet comprising the audio content, said identification information extracted from an information signal sent from the information transmission apparatus, when plurality of audio playing apparatuses receives the information signal, and rejecting a request of an electronic apparatus having identification information different from the identification information when the plurality of audio playing apparatuses receives the information signal.

7. The system according to claim 6, wherein the at least one second processor is further programmed to perform acts of:

producing reply information which is to be transmitted to the electronic apparatus that is identified by the identification information contained in the request that is rejected; and transmitting the reply information to the electronic apparatus.

8. The system according to claim 6, wherein the information signal is transmitted in response to an instruction from a user.

9. The system according to claim 6, wherein the at least one first processor is further programmed to perform an act of storing identification information of at least one audio playing apparatus designated as a recipient of the audio content, wherein the identification information of the at least one audio playing apparatus is used to repeatedly transmit the audio content to the at least one audio playing apparatus.

10. An apparatus for transmitting audio content comprising:

at least one processor programmed to perform acts of:

receiving recipient information designating a plurality of audio playing apparatuses as recipients of audio content;

concurrently transmitting over a wired local area network, to the plurality of audio playing apparatuses designated in the recipient information, at least one packet comprising:

identification information for at least one of the plurality of audio playing apparatuses indicating a recipient of the packet;

at least a portion of the audio content; and control information requiring the playing of the audio content by the at least one of the plurality of audio playing apparatuses designated in the recipient information such that the at least one of the plurality of audio playing apparatuses is instructed to play the audio content concurrently with receiving the audio content;

receiving a rejection message from an audio playing apparatus of the plurality of audio playing apparatuses, the rejection message identifying that the at least one packet has been rejected by the audio playing apparatus;

refraining from transmitting further packets to the audio playing apparatus from which the rejection message is received;

transmitting, to each audio playing apparatus of the plurality of audio playing apparatuses from which no rejection was received, at least one further packet comprising the identification information, at least another portion of the audio content, and the control information; and notifying each of the plurality of audio playing apparatuses to which the transmission of the audio content is completed of an end of transmission of the audio content.

11. The apparatus according to claim 10, wherein the information signal is transmitted in response to an instruction from a user.

12. The apparatus according to claim 10, wherein the at least one processor is further programmed to perform acts of:

storing identification information of at least one audio playing apparatus designated as a recipient of the audio content, using the identification information of the at least one audio playing apparatus to repeatedly transmit the audio content to the audio playing apparatus.

* * * * *